United States Patent [19]

Suga

[11] Patent Number: 4,807,119
[45] Date of Patent: Feb. 21, 1989

[54] MEMORY ADDRESS MAPPING MECHANISM

[75] Inventor: Masao Suga, Tokyo, Japan

[73] Assignee: Kabushiki Kaisha Toshiba, Kawasaki, Japan

[21] Appl. No.: 889,121

[22] Filed: Jul. 24, 1986

[30] Foreign Application Priority Data

Jul. 31, 1985 [JP] Japan .................................. 60-168943

[51] Int. Cl.⁴ ............................................. G06F 12/08
[52] U.S. Cl. ................................................ 364/200
[58] Field of Search .......................... 364/200 MS File

[56] References Cited

U.S. PATENT DOCUMENTS 4,057,848 11/1977 Hayashi ................................ 364/200
4,340,932 7/1982 Bakula et al. ....................... 364/200
4,361,868 11/1982 Kaplinsky ............................ 364/200
4,432,053 2/1984 Gaither et al. ...................... 364/200

Primary Examiner—Thomas M. Heckler
Attorney, Agent, or Firm—Finnegan, Henderson, Farabow, Garrett & Dunner

[57] ABSTRACT

A memory address mapping mechanism includes a flip-flop for latching a signal (PROT) representing the real or protective virtual address mode. AN output signal from the flip-flop is supplied to an address decoder. In either the real or protective virtual address mode, the address decoder receives the address signal from a microprocessor and the signal (PROT) from the flip-flop, decodes the address signal so as to obtain a continuous memory address space, and outputs a memory address selection signal.

1 Claim, 6 Drawing Sheets

F I G. 2
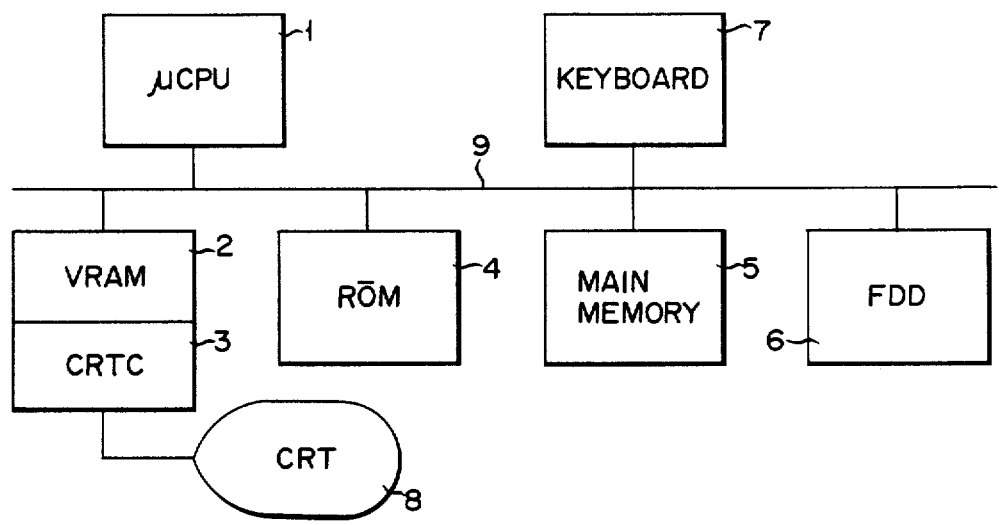
F I G. 4
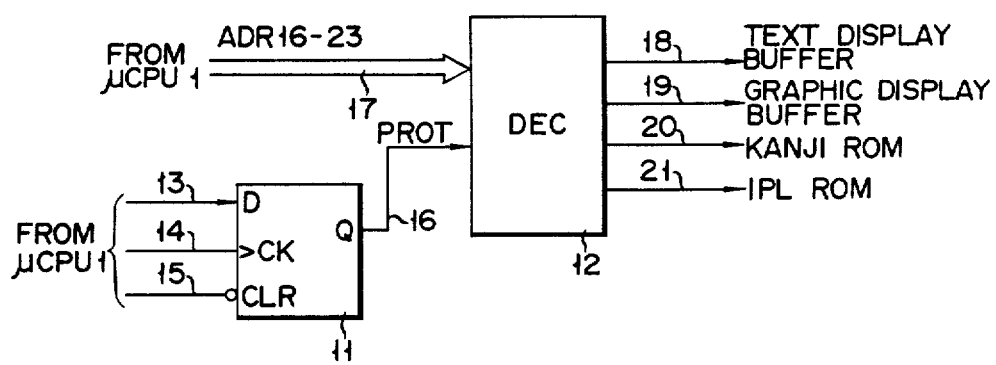

F I G. 3A
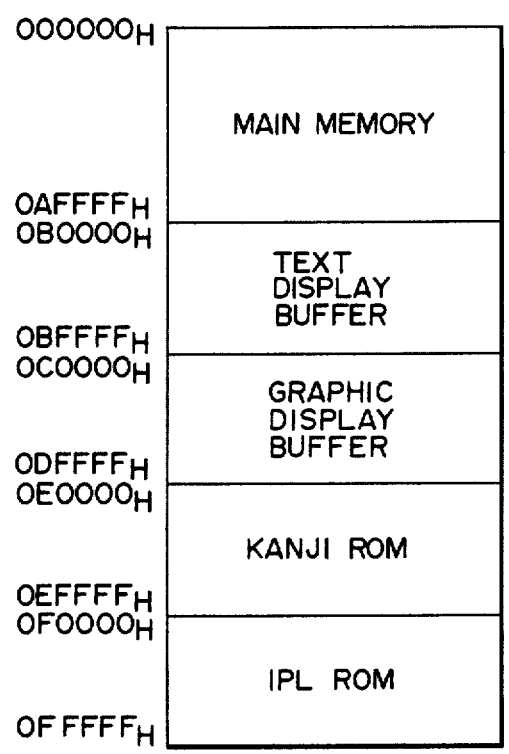

F I G. 3B
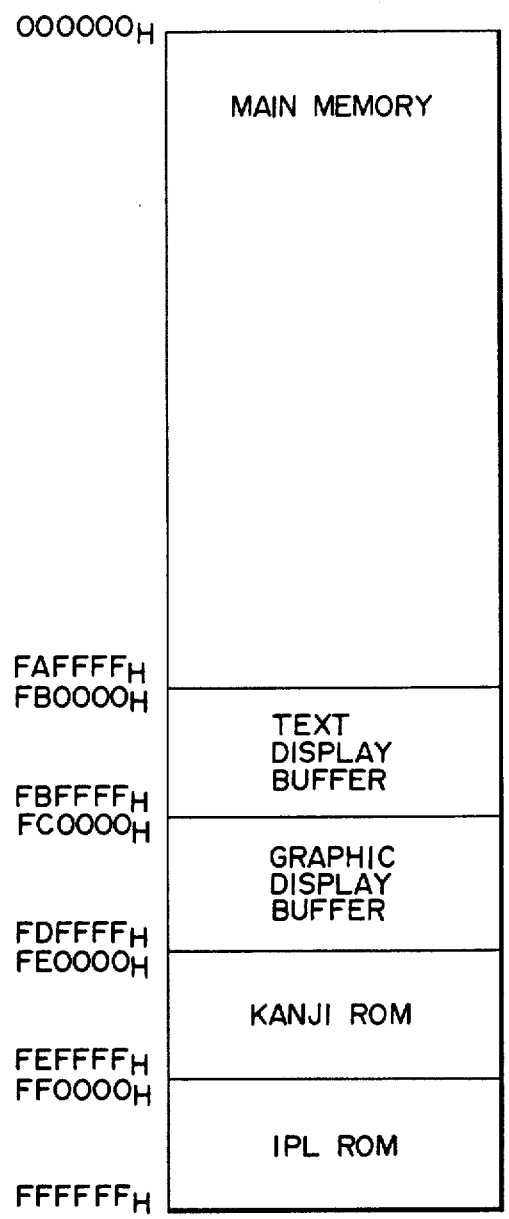

MEMORY ADDRESS MAPPING MECHANISM

BACKGROUND OF THE INVENTION

The present invention relates to a memory address mapping mechanism suitable for a computer system using a microprocessor with a plurality of address modes, whose address spaces have different sizes.

Along with the development of semiconductor techniques inexpensive microprocessors and LSIs are available, so that they can be desirably combined to configure a computer system for achieving optimal performance in specific problem areas. The advances of these semiconductor devices can be found, in particular, in microprocessors. For example, a 16-bit microprocessor for supporting multiuser and multitask architecture, has been developed, as exemplified by a 16-bit microprocessor iAPX286 available from Intel, Inc. This microprocessor has real and protective virtual address modes as execution address modes. In the real address mode, a maximum of 1-Mbyte of address space can be accessed; and in the protective virtual address mode, a maximum of 16-Mbytes of address space can be accessed.

A memory map of a computer system using the above microprocessor is shown in FIG. 1. FIG. 1A shows a memory map in the real address mode, and FIG. 1B shows a memory map in the protective virtual address mode. As is apparent from FIGS. 1A and 1B, common addresses from address "000000" (hexadecimal) to address "0FFFFF" (hexadecimal) are assigned in both the real and protective virtual address modes. Common address allocation in both the modes is aimed at simplifying logic circuits in an address decoder. As shown in FIG. 1B, in the protective virtual address mode, an expansion memory space from address "100000" (hexadecimal) to address "FFFFFF" (hexadecimal) is assigned for a main memory, an area reserved for future use (RFU), and an initial program loading (IPL). For this reason, the main memory address space starting from address "000000" (hexadecimal) is not assigned as a continuous space, and graphic display buffer and IPL ROM address areas are allocated therebetween. According to the allocation described above, however, program memory allocation must always be taken into consideration upon programming of application software, thus overloading programmers.

SUMMARY OF THE INVENTION

It is an object of the present invention to provide a memory address mapping mechanism for reducing programmer work load by adding a small number of hardware elements.

In order to achieve the above object of the present invention, there is provided a memory address mapping mechanism in a computer system having a microprocessor with at least two address modes, whose address spaces have different sizes, and a memory means whose predetermined location is selected, in response to a memory address selection signal, the improvement comprising:

a flip-flop, connected to the microprocessor, for latching an address mode signal from the microprocessor; and a decoder for receiving an address signal from the microprocessor and an output signal from the flip-flop, decoding the address signal so as to provide a continuous address space in each address mode, and, outputting the memory address selection signal to the memory means.

According to the present invention, the address spaces of the real address mode and the protective virtual address mode, whose physical address spaces have different sizes in the computer system, can be respectively continuous spaces. Therefore, the programmer need not consider the address space size during programming of application software, thereby reducing the work load of the programmer.

BRIEF DESCRIPTION OF THE DRAWINGS

Other objects and features of the present invention will be apparent from the following description taken in connection with the accompanying drawings, in which:

FIGS. 1A and 1B show memory maps of a conventional computer system, in which FIG. 1A shows the memory map in a real address mode and FIG. 1B shows the memory map in a protective virtual address mode;

FIG. 2 is a block diagram of a computer system employing the present invention;

FIGS. 3A and 3B show memory maps of the computer system in FIG. 2, in which FIG. 3A shows the memory map in a real address mode and FIG. 3B shows the memory map in a protective virtual address mode;

FIG. 4 is a circuit diagram of a memory address mapping mechanism according to an embodiment of the present invention.

DETAILED DESCRIPTION OF THE PREFERRED EMBODIMENTS

Figure 1A:
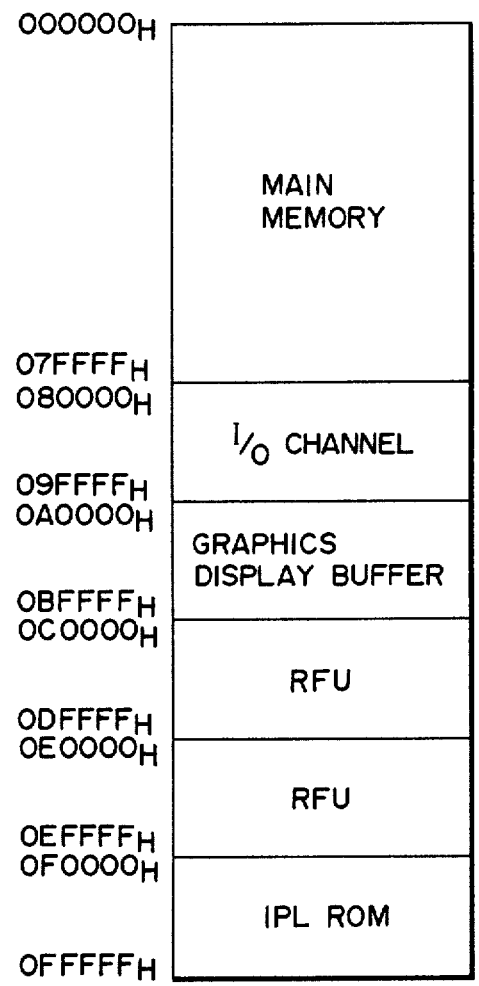
Figure 1B:
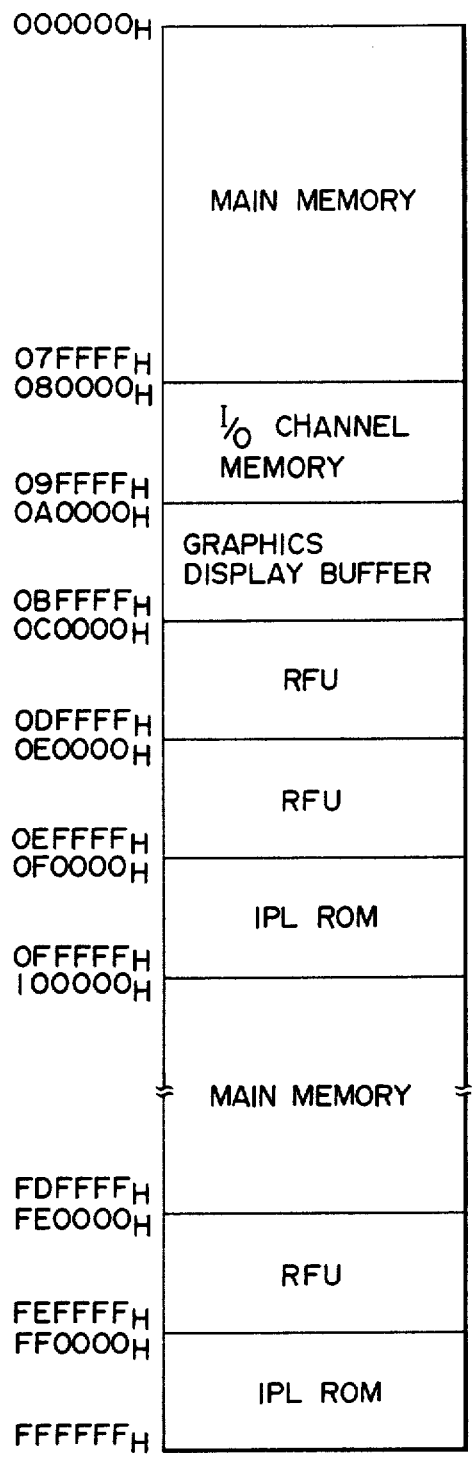

FIG. 2 is a block diagram showing a system configuration of a computer system embodying the present invention. The computer system in FIG. 2 includes microprocessor ($\mu$CPU) 1, display memory (VRAM) 2 such as a text buffer for storing display data, a graphic buffer, etc., display controller (CRTC) 3, and nonvolatile memory (ROM) 4 for storing a system control program. ROM 4 also stores various programs such as an IPL (Initial Program Loader) & Initial Test, a basic I/O driver, and a supervisor. The IPL & Initial Test is a program for executing IPL, hardware operation tests, and hardware initialization. The basic I/O driver is a group of programs for driving input/output hardware resources, i.e., floppy disk driver 6, keyboard 7, and display device 8. The supervisor is a program for controlling all the resources by switching between the real address mode and the protective virtual address mode.

Main memory 5 is a so-called system RAM for storing an operating system and a user task being executed. Submemory 6, such as a floppy disk drive (FDD), stores the operating system and user programs. Keyboard 7 and display device 8 are connected to system bus 9. System bus 9 consists of a plurality of lines for address, data, and control signals. Blocks 2, 3, 4, 5, and 6 described above are commonly connected to bus 9 in addition to microprocessor 1.

FIGS. 3A and 3B show memory maps of the computer system in FIG. 2. FIG. 3A shows the memory map in the real address mode, and FIG. 3B shows the memory map in the protective virtual address mode. The memory address is represented by six hexadecimal digits. In the real address mode, as shown in FIG. 3A, an address space from address "000000" (hexadecimal) through "0AFFFF" (hexadecimal) is assigned as a main memory. An address space from address "0B0000"

(hexadecimal) to address "0BFFFF" (hexadecimal) is assigned as a text display buffer. An address space from address "0C0000" (hexadecimal) to "0DFFFF" (hexadecimal) is assigned as a graphic display buffer. An address space from address "0E0000" (hexadecimal) to "0EFFFF" (hexadecimal) is assigned as a kanji font ROM. An address space from address "0F0000" (hexadecimal) to address "0FFFFF" (hexadecimal) is assigned as an IPL ROM. In the real address mode, an accessible address space is a maximum of 1 Mbyte.

In the protective virtual address mode, a continuous address space of "000000" (hexadecimal) through "FAFFFF" (hexadecimal) is assigned as a main memory. The text display buffer, the graphic display buffer, the kanji ROM, and the IPL ROM are respectively assigned with addresses "FB0000" (hexadecimal) through "FBFFFF" (hexadecimal), addresses "FC0000" (hexadecimal) through "FDFFFF" (hexadecimal), addresses "FE0000" (hexadecimal) through "FEFFFF" (hexadecimal), and addresses "FF0000" (hexadecimal) through "FFFFFF" (hexadecimal). In the protective virtual address mode, an accessible memory address space is a maximum of 16 Mbytes.

FIG. 4 shows an embodiment of a memory address mapping mechanism for translating memory addresses in the real and protective virtual address modes. The memory address mapping mechanism includes flip-flop 11 for accessing protective virtual address and decoder 12. A data signal is supplied from microprocessor 1 to flip-flop 11 through line 13 to set flip-flop 11. Flip-flop 11 receives a write signal from microprocessor 1 at the clock input terminal through line 14. The clear terminal of flip-flop 11 receives a reset signal through line 15. A signal (PROT) representing the protective virtual address mode appears at the Q output terminal of flip-flop 11. Signal PROT is supplied to decoder 12. In this embodiment, signal PROT represents the real address mode if it is set at logic "0". However, if signal PROT is set at logic "1", it represents the protective virtual address mode. Decoder 12 also receives bits 16 through 23 of address data from microprocessor 1. Decoder 12 receives signal PROT and address data (bits 16 through 23) and decodes the address signal. The decoded address signal is sent as a text display buffer selection signal, a graphic display buffer selection signal, a kanji ROM selection signal, or an IPL ROM selection signal onto signal line 18, 19, 20, or 21.

Figure 5:
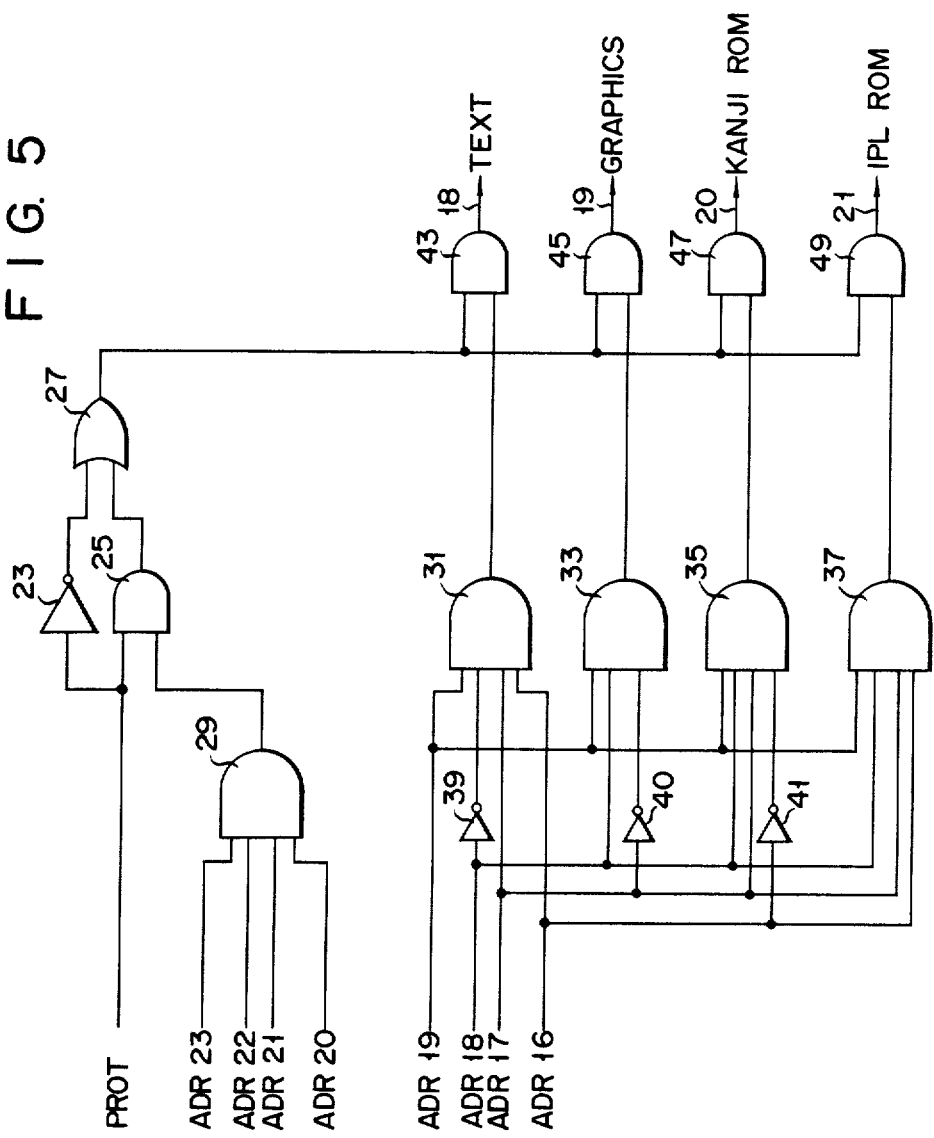
FIG. 5 is a detailed circuit diagram of a decoder in FIG. 4.

FIG. 5 is a detailed circuit diagram of decoder 12 in FIG. 4. Signal PROT from the Q output terminal of flip-flop 11 is supplied to one input terminal of NOR gate 27 through inverter 23 and to one input terminal of AND gate 25. Bits 20 through 23 of the address data supplied from microprocessor 1 are supplied to AND gate 29. An output signal from AND gate 29 is supplied to the other input terminal of AND gate 25. An output signal from AND gate 25 is supplied to the other input terminal of NOR gate 27. Bit 19 of the address data is supplied to the first input terminals of AND gates 31 through 37. Bit 18 of the address data is supplied to the second input terminal of AND gate 31 through inverter 39 and to the second input terminals of AND gates 33 through 37. Bit 17 of the address data is supplied to the third input terminals of AND gates 31, 35, and 37, and to the third input terminal of AND gate 33 through inverter 40. Bit 16 of the address data is supplied to the fourth input terminals of AND gates 31 and 37 and to the fourth input terminal of AND gate 35 through inverter 41.

Output signals from AND gates 31, 33, 35, and 37 are respectively supplied to the second input terminals of AND gates 43, 45, 47, and 49. An output terminal signal from NOR gate 27 is commonly supplied to the first input terminals of AND gates 43, 45, 47, and 49.

The embodiment of the present invention will be described in detail with reference to FIGS. 3A through 5. The circuit of this embodiment is operated in a positive logic. At the time of system initialization or reception of a reset signal, flip-flop 11 is reset so that a Q output signal, i.e., signal PROT, is set at LOW level. In this case, the address mode is the real address mode. The address space shown in FIG. 3A is selected. Assume that the text display buffer is to be accessed in the real address mode. In this case, microprocessor 1 supplies the reset signal to flip-flop 11 through line 15. In order to specify address "0B0000" (hexadecimal), microprocessor 1 outputs address data, bits 16, 17, and 19 of which are set at logic "1", and bits 18 and 20 through 23 of which are set at logic "0". Referring to FIG. 5, signal PROT of logic "0" is inverted by inverter 23 to a signal of logic "1". This logic "1" signal is supplied to the first input terminals of NOR gate 27 and AND gate 25. Bits 20 to 23 of the address data are respectively supplied to the corresponding input terminals of AND gate 29. AND gate 29 supplies an output signal of logic "0" to the second input terminal of AND gate 25. AND gate 25 then supplies an output signal of logic "0" to the second input terminal of NOR gate 27.

NOR gate 27 supplies an output signal of logic "1" to the first input terminals of AND gates 43, 45, 47, and 49. In addition, address bit 19 of logic "1" is commonly supplied to the first input terminals of AND gates 31, 33, 35, and 37. Address bit 18 of logic "0" is supplied to the second input terminal of AND gate 31 through inverter 39 and to the second input terminals of AND gates 33, 35, and 37. Address bit 17 of logic "1" is commonly supplied to the third input terminals of AND gates 31, 35, and 37 and to the third input terminal of AND gate 33 through inverter 40. Address bit 16 of logic "1" is commonly supplied to AND gates 31 and 37 and to the fourth input terminal of AND gate 35 through inverter 41.

As a result, AND gates 31, 33, 35, and 37 respectively supply output signals of logic "1", logic "0", logic "0", and logic "0" to the second input terminals of AND gates 43, 45, 47, and 49. AND gate 43 receives signals of logic "1" so that it outputs a signal of logic "1". However, since AND gates 45, 47, and 49 receive signals of logic "0" and logic "1", outputs therefrom are of logic "0". As a result, only the text display buffer signal is active, and thus the text display buffer can be selected.

An operation for selecting the text display buffer in the protective virtual address mode will be described below.

Microprocessor 1 supplies a data signal of logic "1" and a write signal to flip-flop 11 respectively through lines 13 and 14. Flip-flop 11 supplies signal PROT of logic "1" to decoder 12. The text display buffer in the protective virtual address mode is assigned with addresses "FB0000" (hexadecimal) through "FBFFFF" (hexadecimal), as shown in FIG. 3B. Microprocessor 1 supplies to decoder 12 address data, bit 18 of which is set at logic "0" and bits 16, 17, 19, 20, 21, 22, and 23 of which are set at logic "1".

Referring to FIG. 5, signal PROT of logic "1" is supplied to NOR gate 27 through inverter 23 and to the first input terminal of AND gate 25. Bits 20 through 23 of logic "1" of the address data are supplied to AND gate 29. AND gate 29 supplies a signal of logic "1" to the second input terminal of AND gate 25. As a result, AND gate 25 supplies a signal of logic "1" to the second input terminal of NOR gate 27. NOR gate 27 supplies the signal of logic "1" to the first input terminals of AND gates 43, 45, 47, and 49. Bit 19 of logic "1" is supplied to the first input terminals of AND gates 31, 33, 35, and 37. Address bit 18 of logic "0" is supplied to the second input terminal of AND gate 31 through inverter 39 and commonly to the second input terminals of AND gates 33, 35, and 37. Address bit 17 of logic "1" is supplied to AND gate 33 through inverter 40 and to the third input terminals of AND gates 31, 35, and 37. Address bit 16 of logic "1" is supplied to the fourth input terminal of AND gate 35 through inverter 41 and to the fourth input terminals of AND gates 31 and 37. As a result, AND gates 31, 33, 35, and 37 respectively supply signals of logic "1", logic "0", logic "0", and logic "0" to the second input terminals of AND gates 43, 45, 47, and 49. Therefore, AND gates 43, 45, 47, and 49 output signals of logic "1", logic "0", logic "0", and logic "0", respectively. As a result, the text display buffer can be selected.

What is claimed is:

1. A memory address mapping mechanism in a computer system comprising a microprocessor and a memory system, the microprocessor generating address signals and an address mode signal, and having at least two address modes whose address spaces have different sizes, wherein each of the address spaces is divided into at least two sub-spaces, each having a specified, preliminarily-fixed use, the memory system having predetermined locations selected in response to memory address selection signals, the memory address mapping mechanism comprising:

address mode-selecting means for latching the address mode signal from the microprocessor; and address decoding means connected to the address mode-selecting means for receiving the address signals from the microprocessor and the address mode signal from the address mode-selecting means, for decoding the address signals in accordance with the address mode signal, for producing memory address selection signals from the decoded address signals to specify a logical continuous-address space consisting of at least two sub-spaces having the same use, and for outputting the memory address selection signals to the memory system.

* * * * *